United States Patent
Gourde et al.

(10) Patent No.: US 11,719,342 B2
(45) Date of Patent: Aug. 8, 2023

(54) PACKING STRUCTURE FOR COMPRESSION PACKING

(71) Applicant: 9245-4404 QUEBEC INC., Sherbrooke (CA)

(72) Inventors: Jacques Gourde, Ascot Corner (CA); Maryse Labonté, Ascot Corner (CA)

(73) Assignee: 9245-4404 Quebec Inc., Sherbrooke (CA)

( * ) Notice: Subject to any disclaimer, the term of this patent is extended or adjusted under 35 U.S.C. 154(b) by 21 days.

(21) Appl. No.: 17/545,360

(22) Filed: Dec. 8, 2021

(65) Prior Publication Data

US 2022/0186836 A1    Jun. 16, 2022

Related U.S. Application Data (60) Provisional application No. 63/124,178, filed on Dec. 11, 2020.

(51) Int. Cl.
  *F16J 15/20*    (2006.01)
  *F16J 15/18*    (2006.01)

(52) U.S. Cl.
  CPC ............ *F16J 15/20* (2013.01); *F16J 15/188* (2013.01)

(58) Field of Classification Search
  CPC .......... F16J 15/027; F16J 15/18; F16J 15/184; F16J 15/185; F16J 15/188; F16J 15/20; F16J 15/24; F16J 15/46
  See application file for complete search history.

(56) References Cited

U.S. PATENT DOCUMENTS

| | | | | |
|---|---|---|---|---|
| 1,079,857 A * | 11/1913 | Huhn | ............. | F16J 15/22 277/541 |
| 3,226,126 A * | 12/1965 | Plate | ............. | F16J 15/20 277/540 |
| 3,338,583 A * | 8/1967 | Isdale | ............. | F16J 15/46 251/172 |
| 3,434,728 A * | 3/1969 | Soldato | ............. | F16J 15/185 277/516 |
| 3,578,342 A * | 5/1971 | Satterthwaite | ............. | F16J 15/46 277/646 |
| 3,689,082 A * | 9/1972 | Satterthwaite | ............. | F16J 15/46 277/516 |
| 3,815,926 A * | 6/1974 | Vore | ............. | F16J 15/40 277/927 |
| 4,194,746 A * | 3/1980 | Stevens | ............. | F16J 15/24 277/516 |
| 5,429,374 A * | 7/1995 | Eichenberger | ............. | F16J 15/46 277/567 |
| 10,247,310 B2 * | 4/2019 | Tanner | ............. | F16J 15/46 |

(Continued)

FOREIGN PATENT DOCUMENTS

| | | | | |
|---|---|---|---|---|
| GB | 257688 A | * | 6/1925 | |
| GB | 257688 A | * | 9/1926 | |
| WO | WO-2005071291 A1 | * | 8/2005 | ............. F16J 15/182 |

*Primary Examiner* — Nicholas L Foster
(74) *Attorney, Agent, or Firm* — Gowling WLG (Canada) LLP (57) ABSTRACT

The present disclosure relates to packing material for stuffing boxes. The packing material comprises a resilient body configured to generate a sealing force on shafts and characterized by a directional resiliency to maintain a substantially constant sealing force under conditions of wear and axial displacement of rotating shafts.

16 Claims, 11 Drawing Sheets

(56) References Cited

U.S. PATENT DOCUMENTS

| | | | |
|---|---|---|---|
| 2003/0151209 A1* | 8/2003 | Schmid | F16J 15/185 |
| | | | 277/944 |
| 2007/0138749 A1* | 6/2007 | Pattemore | F16J 15/22 |
| | | | 277/511 |
| 2009/0189353 A1* | 7/2009 | Stokkan | F16J 15/46 |
| | | | 277/334 |
| 2010/0194053 A1* | 8/2010 | Gourde | F16J 15/18 |
| | | | 277/510 |
| 2011/0272890 A1* | 11/2011 | Selby | F16L 5/04 |
| | | | 277/345 |
| 2018/0156208 A1* | 6/2018 | Mahieux | F04B 53/02 |
| 2022/0136605 A1* | 5/2022 | Doyle | F16J 15/184 |
| | | | 277/583 |

* cited by examiner

PACKING STRUCTURE FOR COMPRESSION PACKING

TECHNICAL FIELD

This invention relates generally to compression packing and more specifically to compression packing material for stuffing boxes in sealing applications.

BACKGROUND

Compression packing is commonly used to generate a seal to control leakage of gas or liquids along shafts. So called stuffing boxes are commonly used for seal formation around rotating shafts. Generally, a relatively soft and pliant material such as square braids made of yarns, which may be treated with various lubricants or mixed with wax to reduce friction, are wrapped around a shaft in rings and inserted in an annular space (the stuffing box).

These conventional packing materials present numerous problems. In particular the square braids can rapidly lose their elasticity and become dry upon exposure to high temperatures created by friction with rotating shafts and consequently lose their sealing capacity.

When sealing properties are lessened it is common practice to tighten the stuffing box to further compress the packing material and push it against the shaft. This frequent and forceful compression adjustment is hard on the parts of the stuffing box which must be replaced often.

Another drawback of packing materials of the prior art is their poor capacity to allow adjustment of the uniformity of the pressure on the shaft as the material is compressed in the stuffing box. Because of their poor memory they rapidly lose their sealing property as soon as there is some degradation of the material due to the friction of the rotating shaft.

Furthermore, conventional packing material often needs to be "flattened out" to some extent to fit into the stuffing box. This is commonly accomplished using a hammer, causing the packing material to lose at least some of its sealing properties.

There is therefore a need for improved packing material.

SUMMARY

In an embodiment of the invention there is provided a packing structure for a stuffing box comprising an elongated resilient body for wrapping around a shaft and having an ovoid cross-section, the resilient body having a shaft contacting side, an upper side, lateral sides, and a contoured hollow center and wherein the resilient body is configured to dynamically cooperate with the stuffing box and a shaft associated therewith to generate a centered pressure distribution along the shaft contacting side when the packing structure is compressed in the stuffing box.

The packing structure of the invention is characterized, in one aspect, by a directional resiliency enabling compensating conformational changes upon compression and wear of the resilient body and runout of the shaft.

BRIEF DESCRIPTION OF THE DRAWINGS

The invention will be better understood by way of the following detailed description of embodiments of the invention with reference to the appended drawings, in which.

DETAILED DESCRIPTION

There is provided a packing structure, for stuffing boxes for compression packing/sealing, comprising an elongated resilient body that possesses dynamic properties to generate a resiliently directional seal while minimizing friction with a rotating shaft.

In one aspect of the invention there is provided a packing structure for compression packing to provide a seal at shafts or rods used in mechanical equipment in fluid or gas handling. Typically, the shafts or rods are components of mixing, propulsion, or mechanically rotating machines or apparatuses. The mechanical structure in which the packing structure is inserted is sometimes referred to as a stuffing box. A stuffing box usually comprises a caging in which the packing material is wrapped around the shaft and compressed by a gland to form a seal around the shaft.

In an aspect of the present invention, there is provided a packing structure having a geometry and a material composition configured to dynamically control the pressure on the shaft upon compression by the gland. Among other advantages, the packing structure in accordance with embodiments of the present invention requires less compression force than packing materials of the prior art and also provides a more uniform compression.

Figure 1:
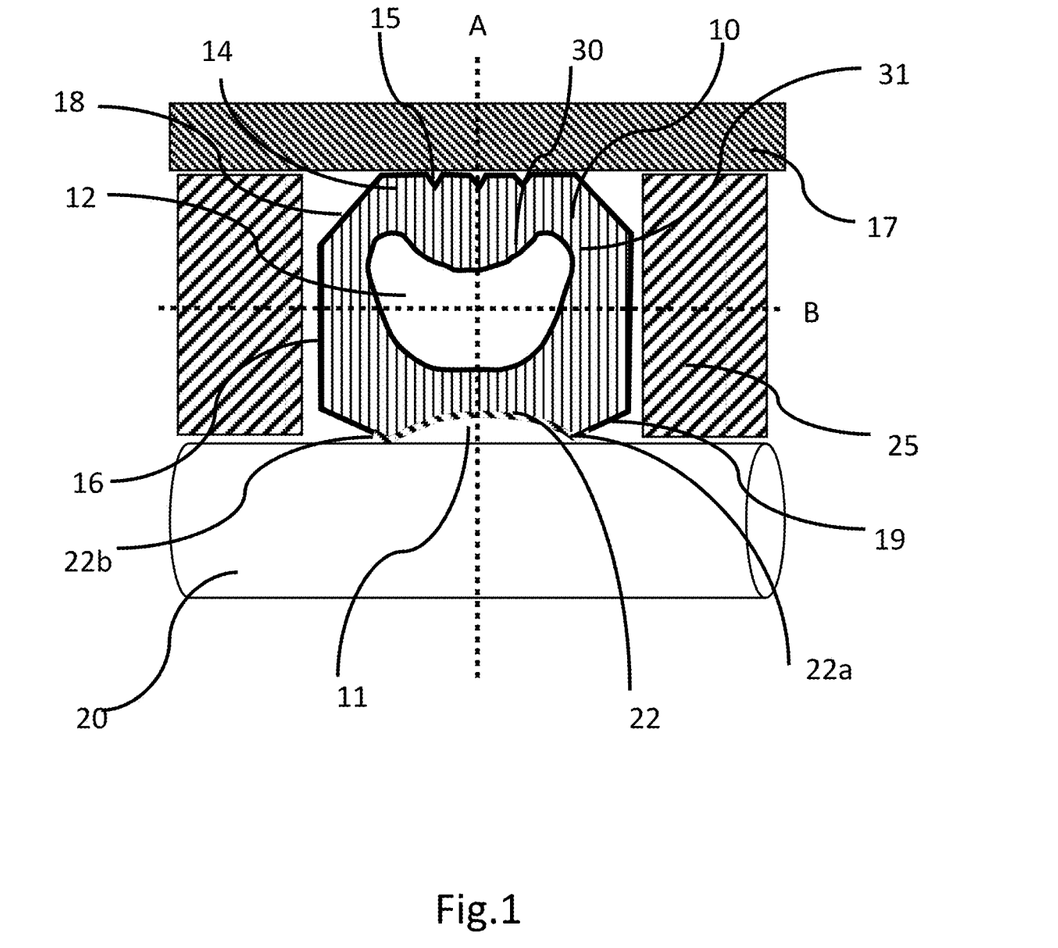
FIG. 1 is a cross-sectional view of the packing material in an uncompressed state in a stuffing box in accordance with an embodiment of the present invention.

As shown in a schematic cross section representation in FIG. 1, the packing structure comprises a resilient body 10 having an ovoid (or oval) cross-section and comprising a shaft contacting side 11, a hollow center 12, an upper side 14, opposite the shaft contacting side, and lateral sides 16. The packing structure is preferably in the form of an elongated elastomeric resilient body that can be wrapped around the shaft. The resilient body is shown in a schematic cross-sectional representation within a stuffing box comprising a casing component 17 and gland 25 that forms part of a gland mechanism. It will be appreciated that the actual design of the stuffing box may vary as would be known in the art. For example, the gland mechanism may comprise a packing gland only on one side of the packing material or on both sides. The resilient body 10 may alternatively have a polygonal cross-section having a plurality of angled sides. Still alternatively, the resilient body 10 may be a hybrid of both ovoid and polygonal features such that one part of the resilient body 10 may by ovoid while another part is polygonal.

The hollow center 12 has a defined contour comprising preferably a concave upper side 30. That is to say, in one embodiment, the contour of the hollow center in the section near the upper side 14 of the resilient body possesses a degree of concavity (arched contour towards the middle of hollow center). The degree of concavity is configured to create a resilient folding deformation of the upper side towards the hollow center when a compression force is applied to the lateral sides 16 in the direction of axis B by gland 25 of the stuffing box thereby creating a downward sealing force. In the embodiment shown in FIG. 1 and FIG. 2, the hollow center 12 is located at the intersection of the axes A and B. In this embodiment, the hollow center 12 is substantially symmetrical about the axis A while being substantially asymmetrical about the axis B.

Figure 2:
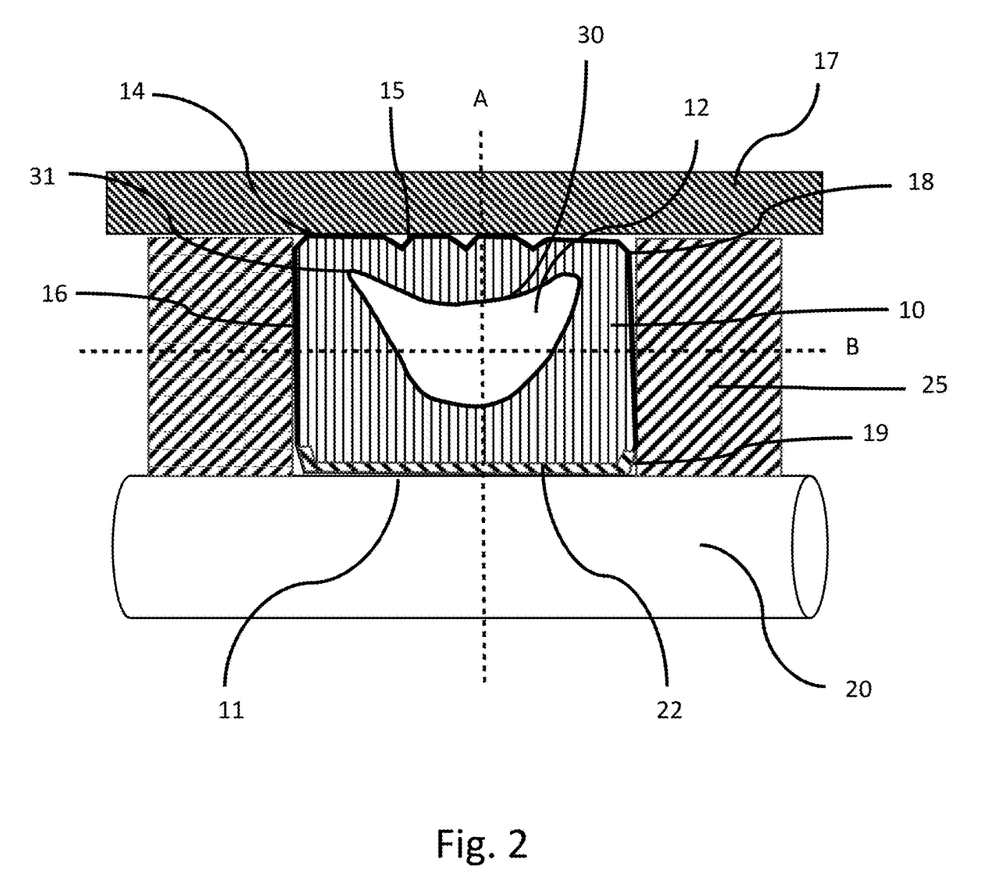
FIG. 2 is a cross-sectional view of the packing material of FIG. 1 shown in a compressed state in the stuffing box.

In an embodiment, the shaft contacting side 11 is arched relative to the long axis of the shaft. In this embodiment, the resiliently dynamic inward folding created by the sideway (or lateral) compression creates a downward force in the direction of axis A that straightens (flattens) the shaft contacting side to dynamically create a centered shaft contacting side pressure distribution. The pressure distribution can be adjusted by compression up to a substantially uniform distribution along the long axis of the shaft 20, parallel to axis B. The uniform pressure can be generated by a substantially flat conformation of the shaft contacting side 11 thereby enabling a uniform pressure across the entire surface of the shaft contacting side. A compressed state of the packing material is shown in FIG. 2. It will be appreciated that the drawing is not necessarily an exact reproduction of the packing structure under compression. The shape of the hollow center 12 and upper side 14, for example, may adopt a different shape under compression than that shown in the drawing. The difference in the conformation of the packing structure between the uncompressed and compressed state may be slight at low compression forces but may be greater at higher compression forces.

The lateral sides 16 of the packing material preferably comprise a straight portion. By straight portion it is meant that at least a portion of the lateral sides is substantially perpendicular to the shaft long axis (axis B). The length of this straight portion is sufficient to prevent the resilient body from "rolling over" within the stuffing box when it is compressed by the gland which would cause, for example, the shaft contacting side to be misaligned relative to the shaft. Furthermore, the straight portion also contributes to generating the directional dynamic conformational change upon compression that optimizes the seal while minimizing the friction as will be further explained below.

In one embodiment, the contoured hollow center possesses a generally crescent shape which comprises a concave upper side 30 and the resilient body 10 may have a generally octagonal shape in the uncompressed state. The resilient body 10 may have a hexagonal shape or other polygonal shape in other embodiments.

Figure 3:
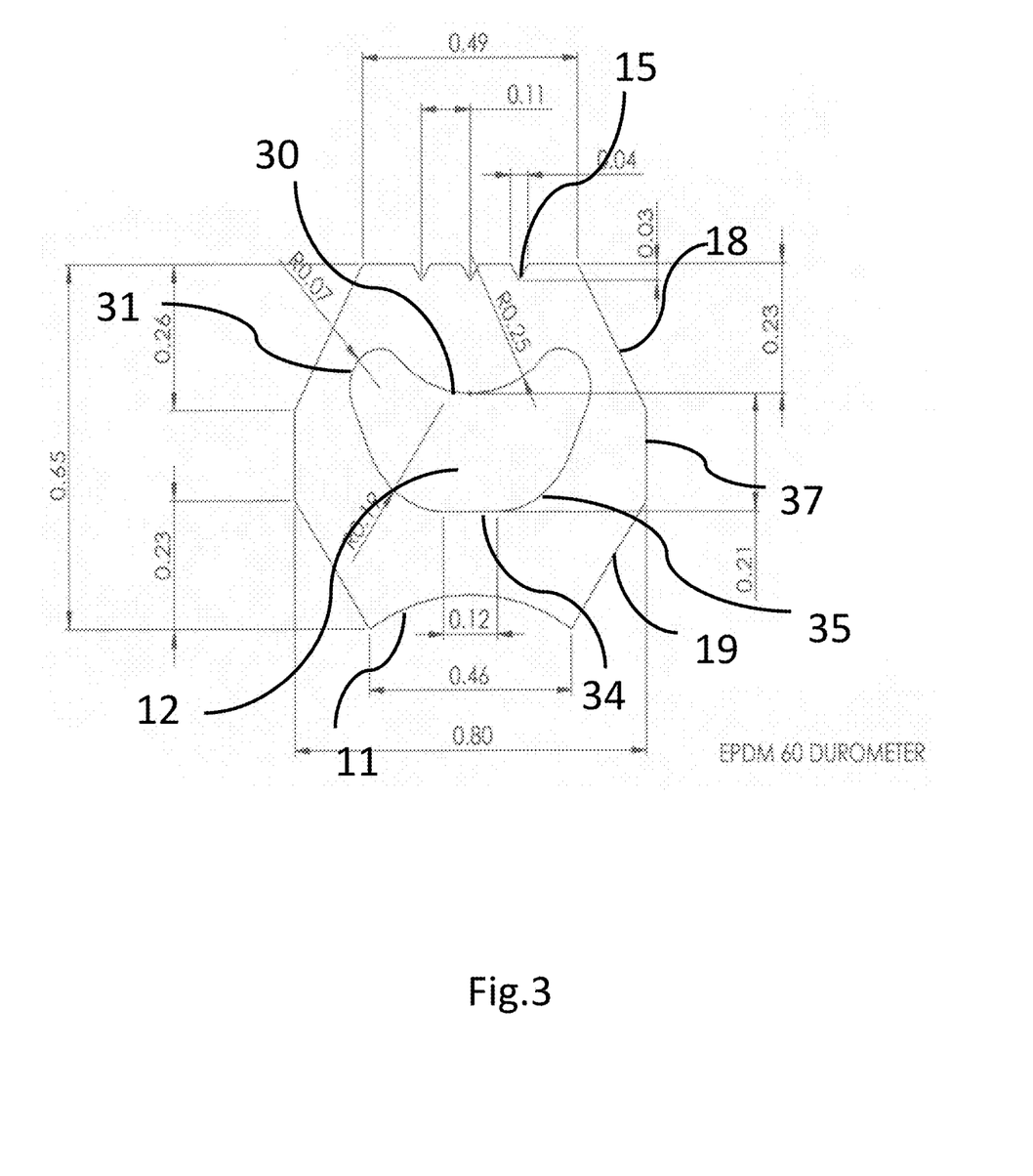
FIG. 3 is a cross-sectional view of the packing material according to an embodiment of the present invention, showing exemplary relative proportions of its structural features.

Exemplary relative dimensions of the packing material for one specific geometry and one particular type of material are shown in FIG. 3. It will be appreciated that the dimensions may be adjusted depending on certain parameters such as the size of the shaft, pressure required to realize the sealing effect and the like. The lateral sides 16 comprise a straight portion 37 and an upper lateral section 18 and a lower lateral section 19. The bottom part 34 of hollow center 12 may comprise a portion that is substantially flat and parallel to the long axis of the shaft (axis B). The contoured hollow center comprises two upper corners 31 defined by the concave upper side 30 and two lower corners 35. In a preferred embodiment, the thickness of the resilient body along the shortest distance between the upper lateral section 18 and the hollow center, that is to say between side 18 and corner 31, is smaller than the thickness along the shortest distance between the lower lateral section 19 and the hollow center, that is to say between side 19 and corner 35. In a preferred embodiment the upper corners have a smaller radius of curvature (R) than that of the concave upper side 30 (or "concave segment") of the contoured hollow center and the two lower corners have a radius of curvature between that of the upper corners and the concave segment. Without wishing to be bound by any theory this configuration contributes to the optimization of the dynamic conformational change generating the downward force upon compression of the lateral sides in the direction of the long axis of the shaft to progressively flatten the shaft contacting side 11 and generate a centered pressure distribution that can be compression adjusted to a pre-determined or desired degree of uniformity up to a substantially uniform pressure on the shaft.

In another aspect, the upper side 14 may comprise treads 15 on its surface. The treads may be configured to optimize the properties of the sealing pressure exercised by the dynamic conformational changes created by the lateral compression of the gland.

The structure of the packing structure is generally symmetrical about axis A but asymmetric relative to an axis B that is substantially parallel to the axis of rotation of the shaft. Referring back to FIG. 2, when the stuffing box is compressed, the shaft contacting side 11 can be straightened to come into contact with the shaft to provide a desired degree of uniformity in the distribution of the sealing force. Thus, the resilient body comprises an asymmetric configuration about an axis substantially parallel to a rotation axis of the shaft (axis B) enabling the dynamic cooperation with the stuffing box to create a uniform downward sealing force to seal the shaft while enabling the optimization (minimizing) of the friction forces thereon in relation to the seal effectiveness.

Figure 4:
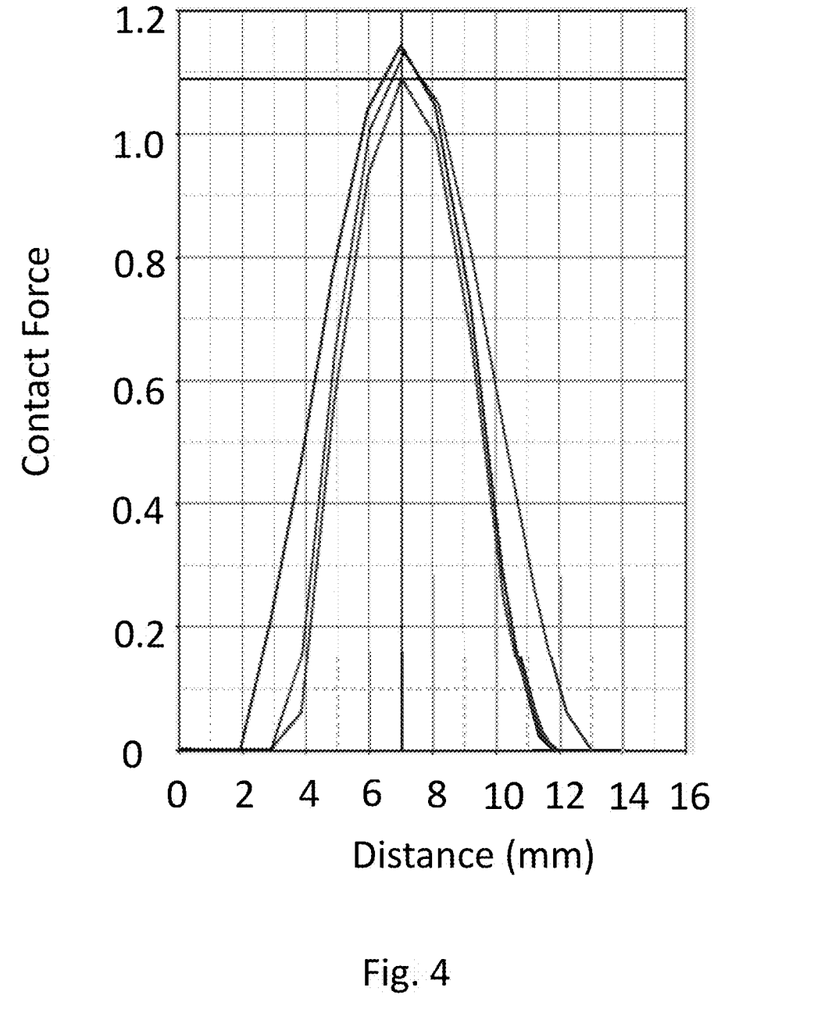
FIG. 4 is a graph of the pressure on the shaft as a function of position along the shaft contacting surface of the packing material according to an embodiment of the packing material.
Figure 5:
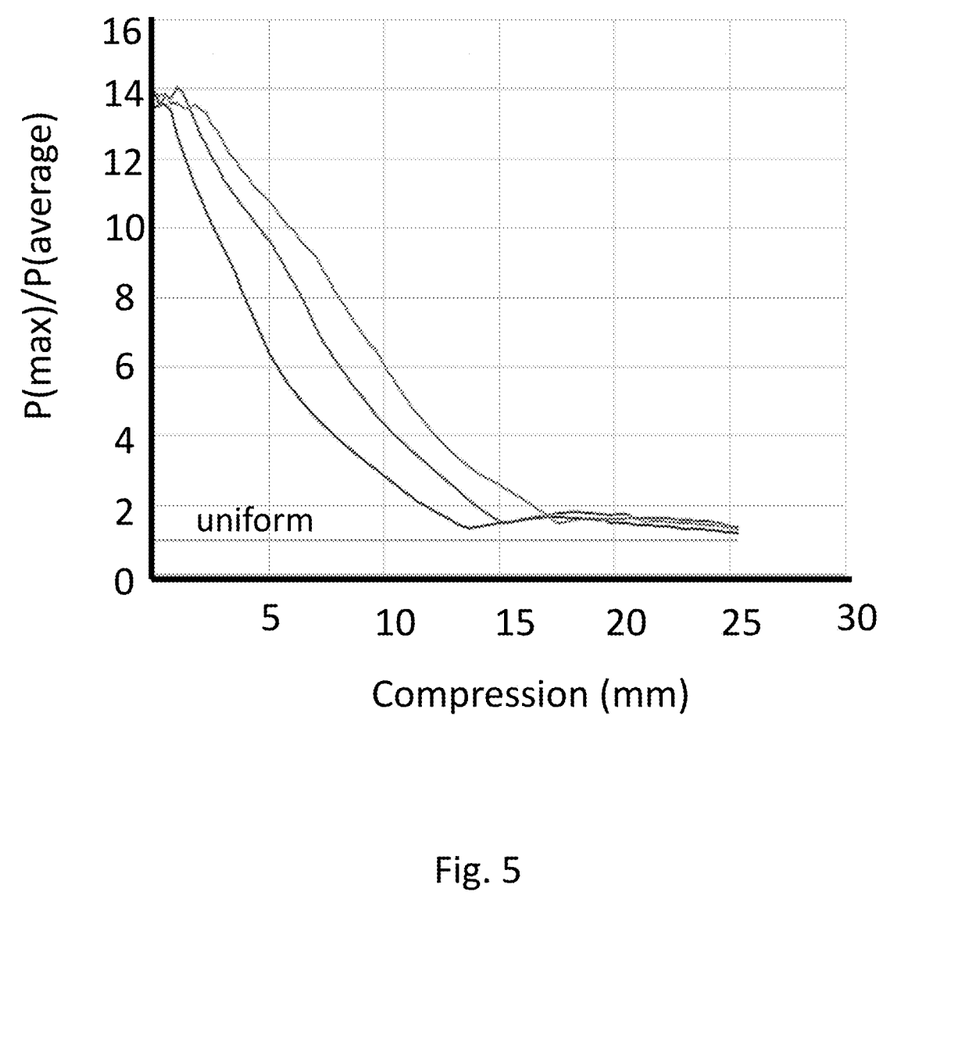
FIG. 5 is a graph representing the uniformity of the pressure on the shaft over the shaft contacting surface as a function of compression.

In one advantageous aspect, the configuration of the resilient body can create a substantially uniform pressure on the shaft in a symmetrical manner along the length of the shaft contacting side 11. That is to say, when the packing material is incrementally compressed, initially a point of maximal pressure on the shaft is created near the middle of the shaft contacting side 11 such that the pressure tapers off on either side of the center approximately according to a bell-shaped distribution (FIG. 4). The entire underside of the shaft contacting side may in fact be in contact with the shaft even if the pressure is distributed according to a bell-shaped distribution. As the compression is increased the pressure along the shaft contacting side 11 becomes increasingly uniform (the bell-shaped profile of the pressure is substantially flattened) until it reaches a substantially uniform distribution characterized by the maximum pressure and the average pressure along the shaft contacting side becoming substantially equal (FIG. 5). That a differential of pressure between the center and the extremities of the shaft contacting side may exist, with pressure in the middle higher than at the extremities, may be beneficial because it reduces wear of the packing material and provides a smoother interaction with the shaft. The extent of this pressure differential can be adjusted by the compression force. This contrasts with conventional packing materials which, contrary to the packing material of the present invention, lose the uniformity of the pressure against the shaft as they are compressed to generate the seal. Furthermore, prior art packing material often creates more pressure at the extremities than at the center upon compression.

Figure 6A:
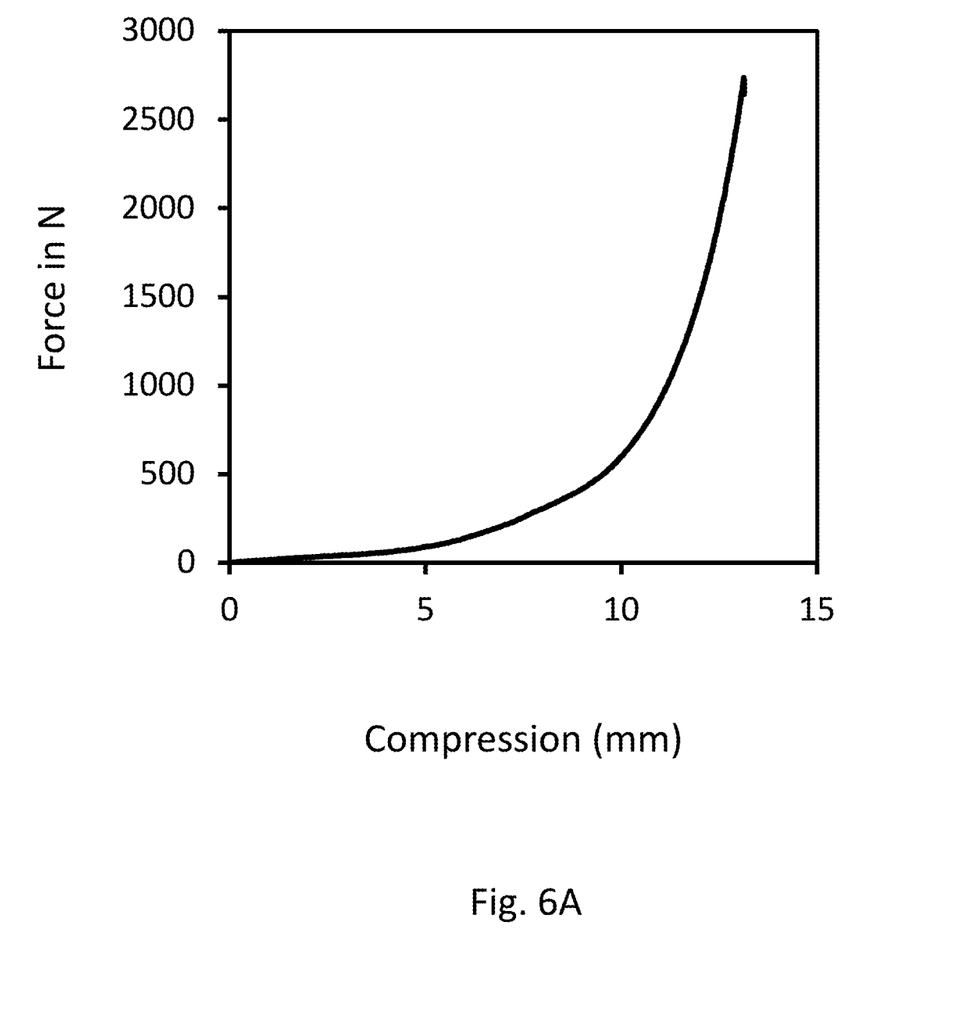
FIG. 6A is a graph of the force as a function of the compression for the packing material of the present invention.
Figure 6B:
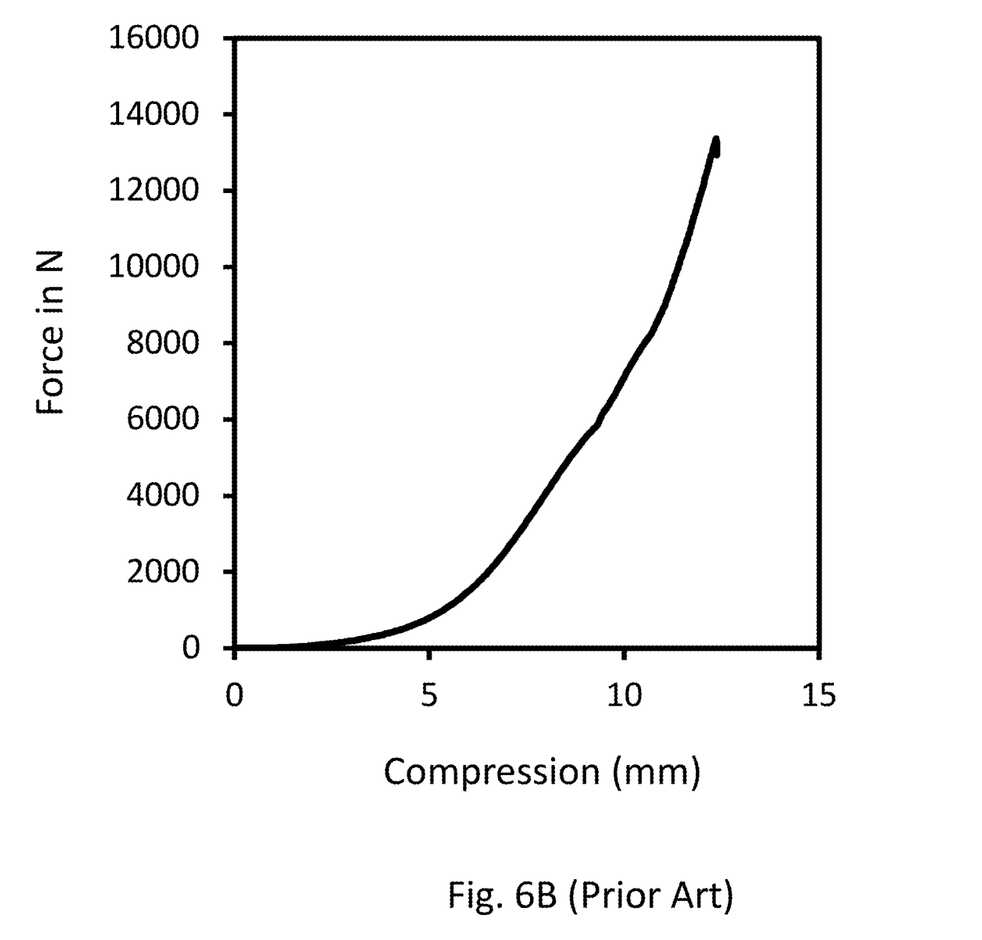
FIG. 6B is a graph of the force as a function of the compression for common packing material of the prior art.

The compression force required to create a good seal with the packing material of the present invention is much less than that required with conventional square braid materials. A comparison of the force required to compress the packing material of the present invention and that of common packing material of similar rigidity (not to be confounded with resiliency) so-called braided compression packing material is shown in FIG. 7A (packing structure of the present disclosure) and 7B (prior art) (note the difference in the y-axes scales). The force required to achieve the same compression is much lower for the packing material of the present invention.

Figure 7:
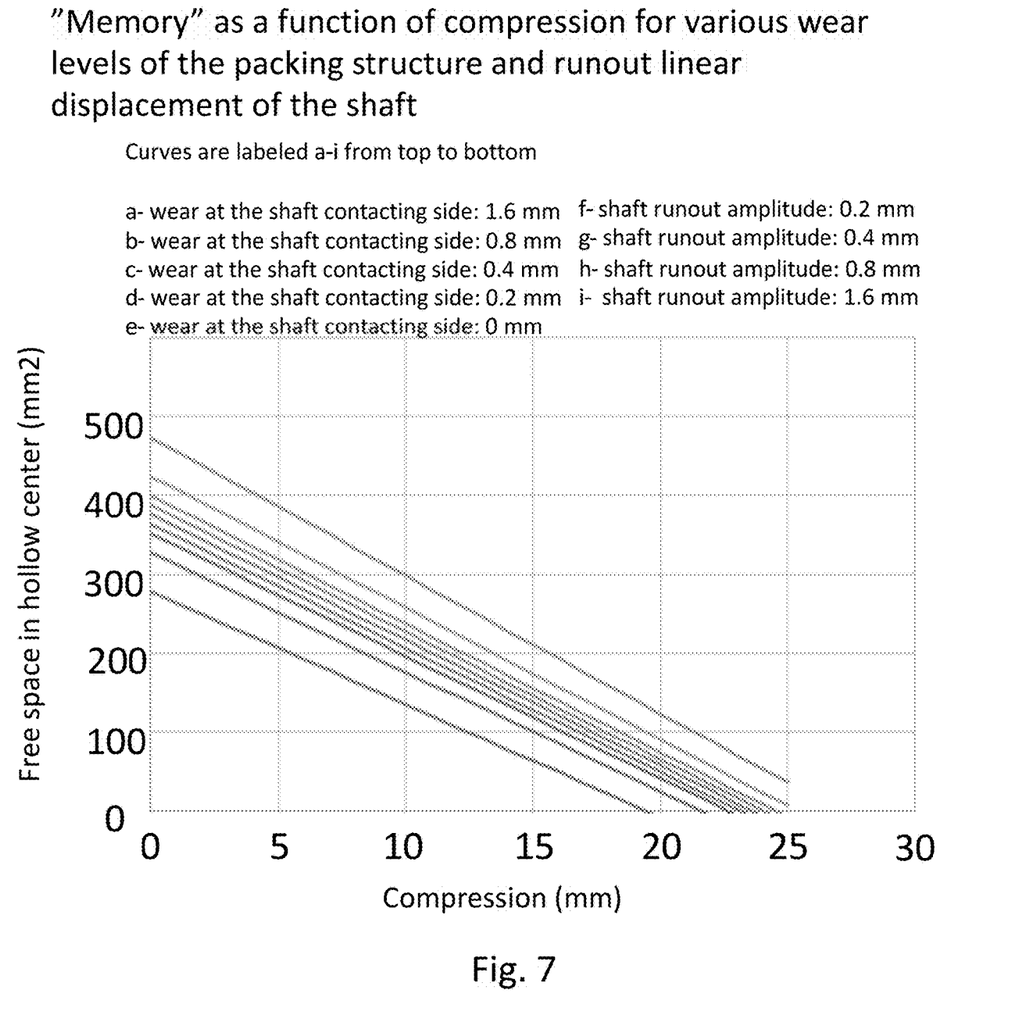
FIG. 7 is a graph of the free space in the hollow center as a function of compression for packing material in accordance with an embodiment of the invention at different stages of wear or runout linear displacement of the shaft.

The packing material of the invention also possesses a conformational memory. That is to say, the resilient body can rapidly and resiliently adjust its conformation in response to changes in compression forces created either by the stuffing box and or the shaft. In other words, the resilient body is characterized by a short relaxation time, shorter than typically used braided compression packing material which have very little memory. Furthermore, the configuration of the present packing structure creates a directional resiliency. By directional resiliency it is meant that the packing structure resilient response directionally propagate the forces towards the shaft contacting side 11 in a substantially uniform manner. This is particularly important to maintain a constant sealing contact with, and force on, the shaft and the stuffing box since shafts usually experience a certain degree of off rotation axis movement (runout) and the packing material is subject to a certain amount of wear. Thus, the packing material of the invention can compensate for runout movements and wear without additional compression by the gland. This is in contrast with the prior art packing material which requires frequent tightening due to its poor memory and its lack of directional resiliency. The compensating compression/expansion of the resilient body is directional because of the contoured hollow center which creates the predominantly downward force towards the shaft. While the contoured hollow center is sufficient to confer directional resiliency, an arched shaft contacting side 11 provides additional degrees of freedom to optimize the sealing force on the shaft. In one aspect, this property can be assessed by the space occupied by the contoured hollow center as a function of the compression under different wear and runout conditions. As shown in FIG. 7 the space occupied by the contoured hollow center as represented by its area in cross-section (free space) is reduced as the compression is increased. But, surprisingly, the variation in free space under different wear and runout conditions remains constant over an extensive compression range indicating a directional resiliency adjustment, i.e. the conformational adjustment of the hollow center 12 is not random. For example, as the wear of the packing structure increases (at the shaft contacting side) the free space of the hollow center increases for a given compression value. This can be explained by the fact that the reduction of material due to wear is compensated by the expansion of the hollow centers and furthermore the magnitude of the variation in expansion is constant as compression is increased. Therefore, the packing structure exhibits directional resiliency. Furthermore, the reduction of free space as a function of compression is linear indicating that the packing structure is capable of symmetrical conformation adaptation thereby keeping a constant pressure on the shaft despite wear of the packing material and runout displacement of the shaft.

The lower lateral sections 19 can also contribute to the directional resiliency and can furthermore create a good seal at the intersection of the cage/gland and the shaft without having to use excessive compression force as is often necessary with packing material of the prior art.

The resiliency and conformational memory of the packing material of the present invention also enable its temporary deformation for insertion into the stuffing box where the packing material will regain its original shape and configuration for proper sealing. This characteristic of the packing material of the present invention advantageously avoids a problem with conventional packing materials which sometimes have to be deformed permanently to fit into the stuffing box.

Figure 8:
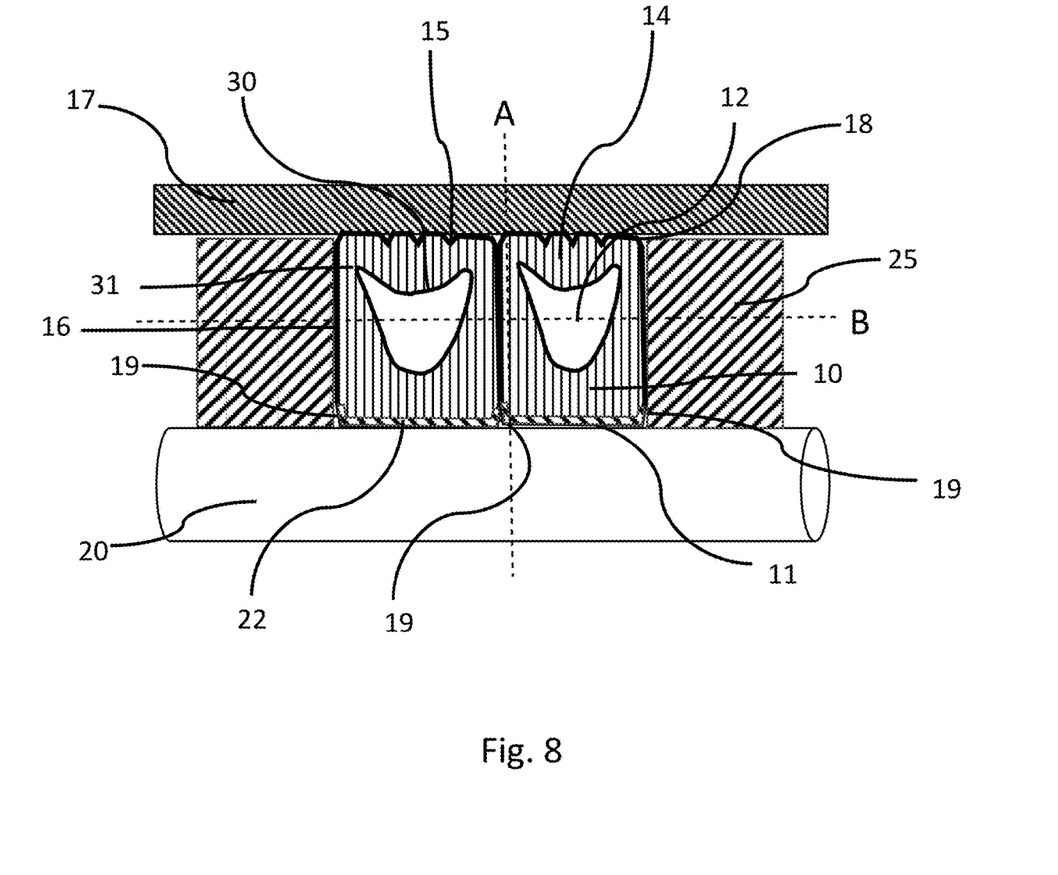
FIG. 8 is a cross-sectional view of two packing structure side by side (or representing two turns of a long seal wrapped around the shaft) in a compressed state in a stuffing box according to an embodiment of the present invention.

The packing material of the present invention further advantageously provides a lateral sealing effect that is superior to common square braid packing material. In most applications the packing material is wrapped around the shaft in rings. The wrapping in rings juxtaposes turns of packing material along the shaft over a predetermined length and can create leaks when the packing material does not completely fill the space between the turns. In one aspect, the packing element of the present invention, when compressed into sealing configuration, allows the lower lateral sections 19 of the sides to come in contact with adjacent resilient bodies to create a lateral seal (see FIGS. 8 and 9). Furthermore, when the lower lateral sections 19 are covered, completely or partially, with a friction reducing material, the lateral seal also protects the resilient body from chemical degradation.

Figure 9:
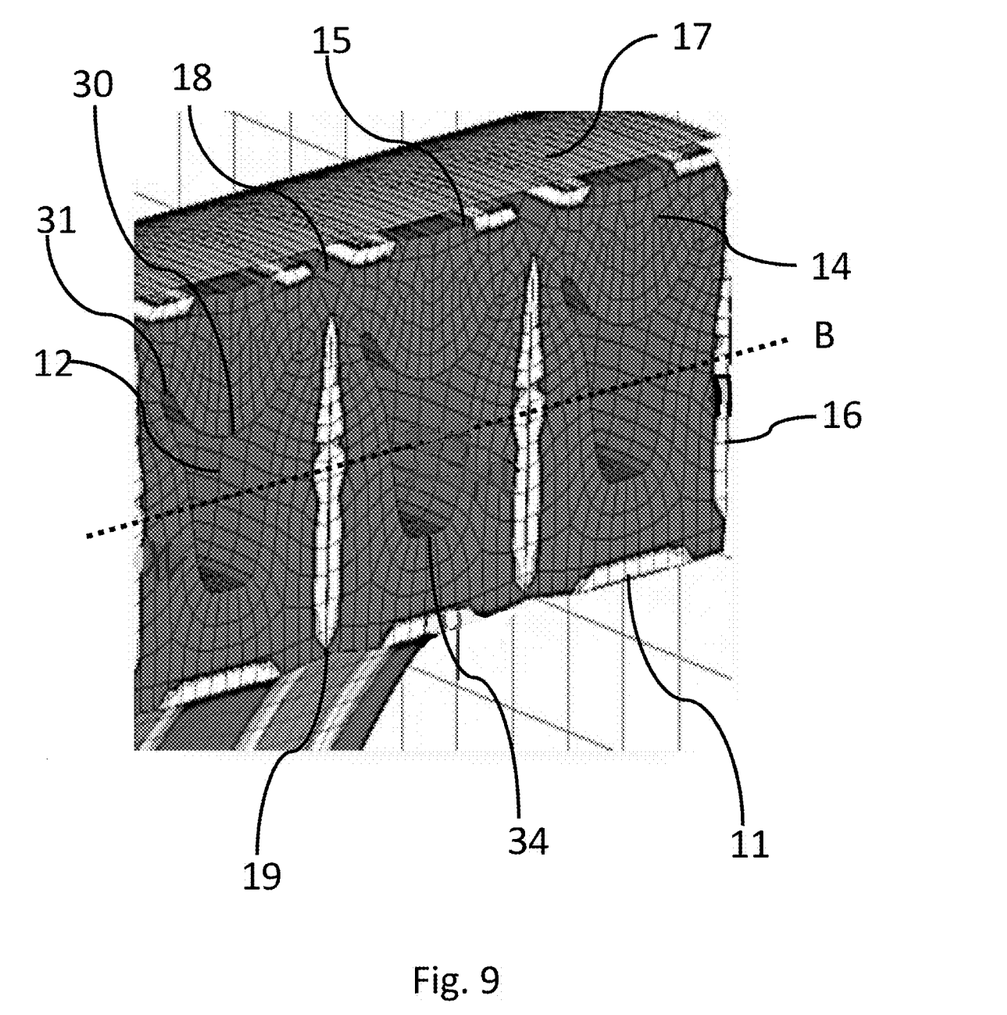
FIG. 9 is a perspective cross-sectional representation of three packing structures side by side showing intensity of contact forces between surfaces (shaft not shown) according to an embodiment of the present invention.

A schematic representation of three rings of packing structure is shown in FIG. 9 in which the contact forces between the different surfaces are shown as zones of white (shaft 20 not shown). The lines of directional resiliency can also be seen in this representation.

It will be appreciated that the degree of resiliency of the resilient body 10 as well as its dimensions can be adjusted to be compatible with the mechanical structure and parameters with which the stuffing box is associated such as the size of the shaft its rotation speed and the like. In one embodiment, the packing material may have a resiliency of between about 40 and 60 on a Duro scale.

In one aspect the resilient body 10 is mainly composed of an elastomer such as ethylene propylene diene monomer (EPDM), preferably EPDM of 60 durometer, and its surface has a coefficient of dynamic friction that is adapted to minimize the friction with a rotating shaft 20. In one embodiment, the surface 22 of the shaft contacting side may be made of a different material than the rest of the resilient body. The material comprising the surface of the shaft contacting side may extend on the lateral sides to some extent as shown at 22a and 22b and the surface of the shaft contacting side 11 comprises a friction reducing polymer such as ultra-high-molecular-weight polyethylene (UHMWPE) or polytetrafluoroethylene (PTFE) for examples. In one preferred embodiment, the UHMWPE has a thickness of between about 0.005 and 0.015 inch and more preferably of about 0.010 inch. The friction reducing polymer may cover part or all of the lower lateral sections 19. It will be appreciated that the dimensions of the friction reducing polymer may be adjusted according to the parameters of specific conditions and apparatus.

In addition to contributing to the dynamic resilience of the resilient body, the contoured hollow center may also contribute to heat dissipation to keep the temperature of the packing material from increasing too rapidly and too extensively. Temperature increase can be detrimental to the physical integrity of the packing material and in fact constitute a major problem with existing, conventional packing materials. Furthermore, increase in temperature can also cause damage to the stuffing box and the shaft. The packing material of the present invention has been shown to be superior in respect to temperature increase when compared to conventional materials such as square braids (see Examples below). In addition to the contoured hollow center the thickness of the shaft contacting side can also be optimized to control the temperature during operation of the shaft. It will be appreciated that this optimization is made taking into consideration the other properties and desired sealing and frictional characteristics of the packing material.

Figure 10:
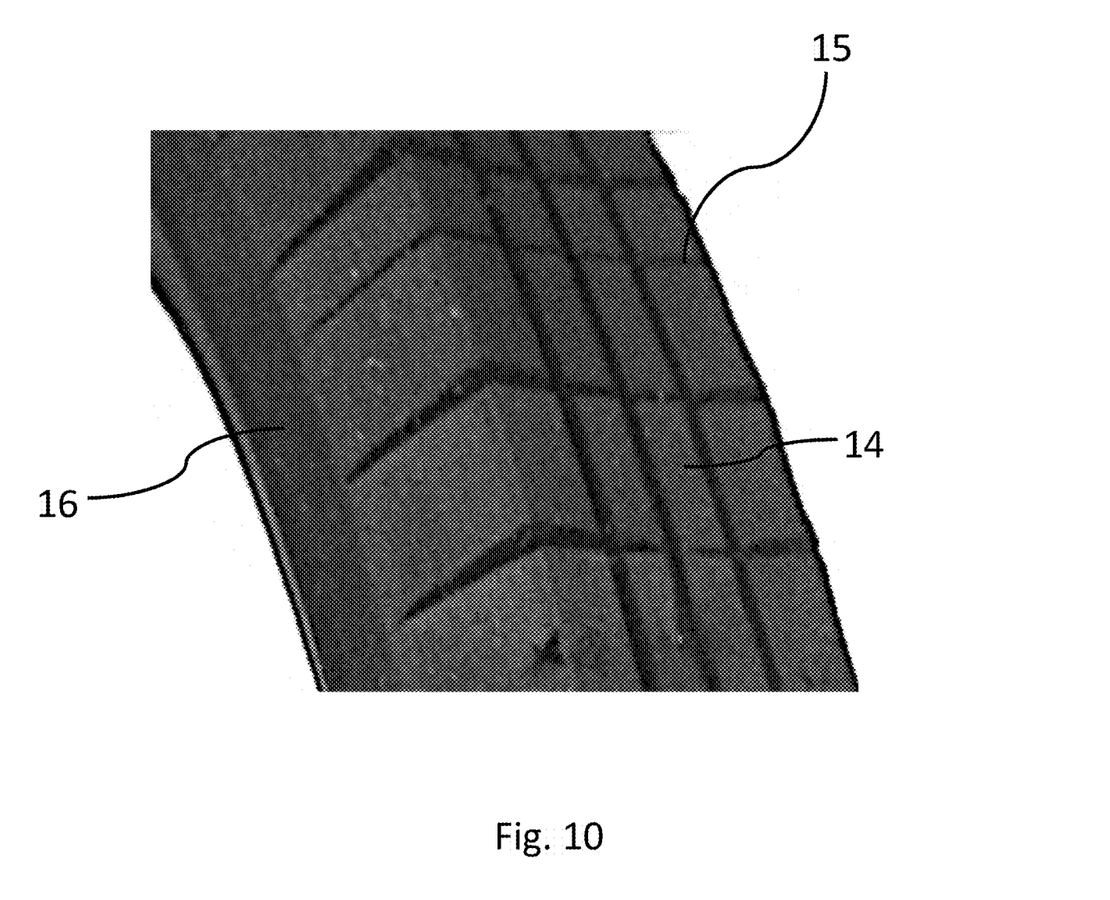
FIG. 10 is a photograph of the packing material in accordance with an embodiment of the invention showing treads on the upper side.

In another aspect of the invention, the packing material may comprise treads 15 on the upper side of the resilient body. In one configuration, some of the treads are parallel to the rotational axis of the shaft to increase the flexibility of the resilient body for an easier wrapping around the shaft (FIG. 10). Furthermore, the resilient body may also comprise treads on its upper side that are perpendicular to the rotational axis of the shaft that, while not necessarily, may contribute to the dynamic resiliency during compression. The treads may also serve to identify the proper orientation of the packing material relative to the shaft.

The advantageous properties of the packing material of the present invention relative to common packing materials, namely easier compressibility to achieve the same sealing effect, directional resiliency, reduced friction for comparable sealing effect, better control of temperature of the packing material and within the stuffing box and better conformational memory not only makes the packing material more performant but reduces the damage done to the stuffing box caused by the frequent and forceful tightening of the gland to achieve an acceptable seal with common packing material. In fact, with common packing materials, when the sealing is loss despite further tightening the entire stuffing box must often be changed. With the packing material of the invention the life span of stuffing boxes is greatly increased. The reduced friction (which is not only a function of the nature of the material but also the temperature) also contributes to minimizing the power required to drive the rotation of the shaft. These properties reduce production costs considerably.

EXAMPLES

Temperature Profile

Tests comparing the temperature increase on a shaft and stuffing box when using the packing material of the present invention and a conventional packing material comprising carbon fibers impregnated with PTFE with a high temperature lubricant (Garlock Paper Pak 5000) were performed with a shaft of 5 inches diameter at 525 linear feet per minute. The results showed that after about 20 minutes of operation the packing material of the invention had a much lower temperature: 27° C. v. 42° C. for the conventional packing. This is a very significant difference and contributes to maintain the physical integrity of not only the packing material but also of the stuffing box and the shaft.

Leakage Tests

Numerical simulation tests have shown that the packing material of the present invention can withstand a liquid pressure equivalent to a 200 feet water column in the context of a pump shaft.

This invention has been described in terms of specific embodiments, implementations and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

What is claimed is:

1. A packing structure for a stuffing box comprising and elongated resilient body for wrapping around a shaft and having an ovoid or approximately polygonal cross-section, the resilient body having a shaft contacting side, an upper side, lateral sides, and a contoured hollow center having a crescent shape defining a concave upper side with upper corners at each end of the concave upper side, and wherein the upper corners, in an uncompressed state of the packing structure, are substantially above a lowest point of the concave upper side in a direction substantially perpendicular to a long axis of the shaft, the contoured hollow center further comprising a substantially straight portion opposite the concave upper side that is substantially parallel to the long axis of the shaft and having rounded lower corners at each end of the substantially straight portion, the crescent shape contoured hollow center being substantially symmetrical about an axis perpendicular to the long axis of the shaft and configured to enable the upper side of the resilient body to be resiliently and downwardly compressed towards the hollow center upon application of a compression force on the packing structure exerted substantially parallel to a rotation axis of the shaft to generate a substantially centered pressure distribution along the shaft contacting side, and wherein the resilient body is configured to dynamically cooperate with the stuffing box and the shaft associated therewith to generate a centered pressure distribution along the shaft contacting side when the packing structure is compressed in the stuffing box.

2. The packing structure of claim 1, wherein the shaft contacting side has an arched profile relative to a long axis of the shaft.

3. The packing structure of claim 2, wherein the hollow center and the shaft contacting side have a relative configuration enabling the centered pressure distribution to be compression adjustable to a degree of uniformity along a cross section of the shaft contacting side.

4. The packing structure of claim 2, wherein the centered pressure distribution is substantially symmetrical relative to the center of the shaft contacting side.

5. The packing structure of claim 2, wherein the upper corners, the lower corners and the concave upper side of the crescent shape contoured hollow center have a radius of curvature and wherein the radius of curvature of the upper corners is smaller than the radius of curvature of the lower corners and the radius of curvature of the lower corners is smaller than the radius of curvature of the concave upper side.

6. The packing structure of claim 2, wherein the cross-section of the resilient body is approximately octagonal and wherein the lateral sides comprise an upper and a lower lateral section on either side of a substantially straight portion.

7. The packing structure of claim 2, wherein the resilient body is made at least partially of an elastomer and the shaft contacting side comprises a friction reducing material.

8. The packing structure of claim 7, wherein the friction reducing material is Teflon polytetrafluoroehtylene.

9. The packing structure of claim 7, wherein the friction reducing material is UHMWPE.

10. The packing structure of claim 7, wherein the friction reducing material extends beyond the shaft contacting side onto lower lateral sections of the resilient body.

11. The packing structure of claim 2, wherein the resilient body comprises treads on a surface of its upper side.

12. The packing structure of claim 11, wherein at least part of the treads is configured to lower bending resistance of the packing material to facilitate wrapping around the shaft.

13. A stuffing box comprising the packing structure of claim 6.

14. The stuffing box of claim 13, wherein a single length of packing structure is wrapped around the shaft more than once.

15. The stuffing box of claim 13, further comprising an additional packing structure, wherein the resilient bodies of the packing structures are independent from one another.

16. A packing structure for a stuffing box comprising an elongated resilient body for wrapping around a shaft and having an approximately polygonal cross-section, the resilient body having a shaft contacting side, an upper side, lateral sides, and a contoured hollow center having a crescent shape defining a concave upper side with upper corners at each ends of the concave upper side and wherein the upper corners, in an uncompressed state of the packing structure, are substantially above a lowest point of the concave upper side in a direction substantially perpendicular to a long axis of the shaft, the contoured hollow center further comprising a substantially straight portion opposite the concave upper side that is substantially parallel to the long axis of the shaft and having rounded lower corners at each end of the substantially straight portion and wherein the upper corners, the lower corners and the concave upper side of the crescent shape contoured hollow center having a radius of curvature and wherein the radius of curvature of the upper corners is smaller than the radius of curvature of the lower corners and the radius of curvature of the lower corners is smaller than the radius of curvature of the concave upper side, the crescent shape contoured hollow center being substantially symmetrical about an axis perpendicular to the long axis of the shaft and configured to enable the upper side of the resilient body to be resiliently and downwardly compressed towards the hollow center upon application of a compression force on the packing structure exerted substantially parallel to a rotation axis of the shaft to generate a substantially centered pressure distribution along the shaft contacting side, and wherein the resilient body is configured to dynamically cooperate with the stuffing box and the shaft associated therewith to generate a centered pressure distribution along the shaft contacting side when the packing structure is compressed in the stuffing box.

* * * * *